(12) United States Patent
Gaynor et al.

(10) Patent No.: US 6,533,855 B1
(45) Date of Patent: Mar. 18, 2003

(54) DISPERSIONS OF SILICALITE AND ZEOLITE NANOPARTICLES IN NONPOLAR SOLVENTS

(75) Inventors: Justin F. Gaynor, San Jose, CA (US); Judy Huang, Los Gatos, CA (US)

(73) Assignee: Novellus Systems, Inc., San Jose, CA (US)

( * ) Notice: Subject to any disclaimer, the term of this patent is extended or adjusted under 35 U.S.C. 154(b) by 205 days.

(21) Appl. No.: 09/782,985

(22) Filed: Feb. 13, 2001

(51) Int. Cl.[7] .......................... C01B 37/02; C01B 39/02
(52) U.S. Cl. ................................. 106/287.14
(58) Field of Search .................. 106/287.1, 287.11, 106/287.14, 287.16

(56) References Cited

U.S. PATENT DOCUMENTS

| | | |
|---|---|---|
| 2,801,185 A | 7/1957 | Iler |
| 4,073,865 A | 2/1978 | Flanigen et al. |
| 4,652,467 A | 3/1987 | Brinker et al. |
| 4,849,284 A | 7/1989 | Arthur et al. |
| 4,865,875 A | 9/1989 | Kellerman |
| 4,994,302 A | 2/1991 | Kellerman |
| 5,055,342 A | 10/1991 | Markovich et al. |
| 5,103,288 A | 4/1992 | Sakamoto et al. |
| 5,149,590 A | 9/1992 | Arthur et al. |
| 5,354,611 A | 10/1994 | Arthur et al. |
| 5,453,293 A | 9/1995 | Beane et al. |
| 5,470,802 A | 11/1995 | Gnade et al. |
| 5,494,858 A | 2/1996 | Gnande et al. |
| 5,494,859 A | 2/1996 | Kapoor |
| 5,504,042 A | 4/1996 | Cho et al. |
| 5,561,318 A | 10/1996 | Gnade et al. |
| 5,614,250 A | 3/1997 | Diener et al. |
| 5,712,402 A | 1/1998 | Pinnavaia et al. |
| 5,801,092 A | 9/1998 | Ayers |
| 5,855,894 A | 1/1999 | Brown et al. |
| 6,022,519 A | 2/2000 | Shimizu et al. |
| 6,329,062 B1 * | 12/2001 | Gaynor .................... 428/447 |

FOREIGN PATENT DOCUMENTS

| | | |
|---|---|---|
| JP | 60-97298 | 4/1994 |
| JP | 7112126 | 5/1995 |

OTHER PUBLICATIONS

Huang et al. "Fabrication of Ordered Porous Structures by Self—Assembly of Zeolite Nanocrystals," *Journal of American Chemical Society*(Mar. 22, 2000,)pp. 3530–3531.
Schoeman, Brian J. "Analysis of the Nucleation and Growth of TPA–Silicalite–1 at Elevated Temperatures with the Emphasis on Colloidal Stability," *Microporous and Mesoporous Materials*, vol. 22, 1998, pp. 9–22.

(List continued on next page.)

*Primary Examiner*—David Brunsman
(74) *Attorney, Agent, or Firm*—Skjerven Morrill LLP

(57) ABSTRACT

The present invention relates to chemical modifications of the surfaces of silicalite and high-silica zeolite nanoparticles permitting such particles to be dispersed in nonpolar hydrophobic solvents, and to the dispersions so produced and to interlayer dielectric layers, molecular sieve membranes and/or catalytic membranes formed from such dispersions, and to the fabrication of integrated circuits in the case of interlayer dielectric layers. A dispersion of silicalite or high-silica zeolite nanoparticles is formed in alkaline aqueous solution. The pH of the solution is reduced by multiple rinsing with deionized water to approximately pH of 9 or 10. The solution is then rendered acidic, typically pH between 2 and 3, by the addition of a suitable acid. The acidic solution is gradually intermixed with an alcohol under conditions of elevated temperature and/or reduced pressure to enhance the solvent evaporation rate. In this form, the silicalite or high-silica zeolite nanoparticles are reacted with reactants to cause the silanol groups on the surface to form direct silicon-hydrocarbon bonds or, in alternative embodiments, to undergo etherification. The silicalite particles thus modified may be redispersed into nonpolar solvents suitable for combination with binding agents and for the formation of dielectric layers on integrated circuits.

13 Claims, 1 Drawing Sheet

OTHER PUBLICATIONS

Li, Qinghua, "Crystallization of Colloidal TPA–Silicalite–1 by a Two–Stage Varying—Temperature Synthesis," Lulea *http://www.km.luth.se/kmt/theses/theses.htm*,(Dec. 1999,)pp. 1–32.

White, J.W., "Solid State Molecular Science," Research School of Chemistry Annual Report, 1996, pp. 1–14.

Jobic, H.; Bee, M., "Diffusion in Zeolites," *http://www.ill.fr/AR–97/page/04chemi.htm*, 1997, pp. 1–3.

Cheetham et al. "Open–Framework Inorganic Materials," Angew.Chem. Int. Ed. vol. 38, 1999, pp. 3268–3291.

Persson et al. "The Synthesis of Discrete Colloidal Particles of TPA–Silicalite–1," *Zeolites*, vol. 14, (Sep./Oct. 1994,)pp. 557–567. (No p. 558).

Tsapatis, Michael, "Growth and Application of Silica Thin Films," *http://chemical.uc.edu/abstract/may25.htm*, 2000, pp. 1–2.

Otterstedt, Jan–Erik; Brandreth, Dale A., "Small Particles Technology," Plenum Press, New York, 1998.

Pergo, G. et al. "Titanium–Silicate: a Novel Derivative in the Pentasil Family," *Studies in Surface Science and Catalysis*, vol. 28, Aug. 1986, pp. 129–136.

* cited by examiner

DISPERSIONS OF SILICALITE AND ZEOLITE NANOPARTICLES IN NONPOLAR SOLVENTS

BACKGROUND

1. Technical Field

The present invention relates to silicalite and zeolite nanoparticles and, more particularly, to methods of preparing nonaqueous dispersions of such nanoparticles, to the dispersions so prepared, and to applications of the dispersions to produce interlayer dielectrics in the fabrication of integrated circuits.

2. Description of Related Art

Increasing the speed and performance of integrated circuits ("ICs") typically calls for increasing the density of electronic components on the surface of a semiconductor wafer and increasing the speed at which the IC performs its functions. Increasing component density brings charge-carrying circuit elements closer together, thereby increasing the capacitive coupling (crosstalk) between such circuit elements and delay in the propagation of signals through the conductors. Higher capacitance is detrimental to circuit performance, especially for higher frequency operation as would typically be encountered in telecommunication applications and elsewhere. One way of reducing capacitive coupling between proximate circuit elements is to reduce the dielectric constant ("k") of the insulator or insulating material(s) separating the coupled circuit elements.

It has been conventional in the fabrication of ICs to use dense materials as dielectrics, including silicon dioxide, silicon nitride and cured silsesquioxanes among others. The dielectric constant of these materials typically lies in the range of approximately $$k \sim 3.0 \text{ to } 7.0 \qquad \text{Eq. 1}$$

The IC industry has entered a regime in which performance of ICs is typically limited by resistive-capacitive ("RC") delay occurring in the metallic interconnects of the IC, indicating that lower k dielectrics will be required for future ICs. As yet, the only fully dense materials with k less than about 2.4 are fluorinated polymers or fully aliphatic hydrocarbon polymers. However, such materials have not been shown to have sufficient thermal and mechanical stability to survive the heat and mechanical stresses occurring during IC fabrication. In addition, these polymers typically have chemical properties that are similar in some respects to the chemical properties of photoresist materials commonly used in IC fabrication. Thus, selective chemical removal of photoresist layers and dielectric layers becomes more difficult.

Several candidate low k materials for IC dielectrics include materials having a high degree of porosity. The open structure of such porous materials includes a significant amount of airspace. Therefore, the overall effective dielectric constant of the material lies between those of air and the fully dense material, typically significantly lower than that of the pure, solid material. Several general classes of porous materials have been described, including porous silicon dioxides.

Previous work by one of the present inventors relates to the use of silicalite nanocrystals ("SNCs") in forming spin-on dielectric coatings (interlayer dielectric, "ILD") in the fabrication of ICs as described in US patent application Ser. No. 09/514,966 incorporated herein by reference. Silicalites are porous crystalline forms of silica having the same crystal structure as zeolites, as described, for example, by Edith Flanigen and Robert Lyle Patton (U.S. Pat. No. 4,073,865). Colloidal suspensions of silicalite nanoparticles are described, for example, by Jan-Erik Otterstedt and Dale A. Brandreth, *Small Particles Technology* (Plenum Press, 1998), especially Chapt. 5. See also *The Synthesis of Discrete Colloidal Particles of TPA-Silicalite-1* by A. E. Persson et. al. appearing in *Zeolites*, September/October 1994, pp. 557–567. SNCs offer the possibility of a porous, low k dielectric material that can easily be deposited on semiconductor wafers with standard wafer processing techniques and that can withstand subsequent etching, polishing and metallization steps.

However, SNCs are not suitable for ILD formation by themselves. A suitable binding agent must be used in cooperation with the SNC. That is, an SNC is typically deposited on the surface of a wafer along with a binding agent. Favored binding agents typically contain silicon and oxygen and crosslink at elevated temperatures, binding the SNCs into a porous ILD having adequate mechanical strength to withstand further IC processing. "Monolithic films" denote the films created by nanoparticles having been bound together by a binding agent. Binding agents based on silicon dioxide are desirable because of their proven compatibility with current IC processing steps, such as dielectric reactive ion etching and photoresist removal.

Silicate nanoparticles are typically made in aqueous solution and usually in a basic aqueous solution. However, typical silica-based binding agents used for forming ILDs from SNCs coagulate into a gel in the presence of water, especially so in the presence of water and base. Thus, fabricating practical ILDs from SNCs and binding agents must deal with the challenge of the catalytic effect of water in causing premature agglomeration of typical binding agents. The present invention relates to methods of redispersing SNCs from the basic aqueous solution in which they are typically made into a hydrophobic organic solvent while overcoming the tendency of SNCs to agglomerate and/or precipitate in nonaqueous solution. The process of fabricating ILDs from SNCs is thereby facilitated.

In addition to ILDs, other applications for monolithic films of silicalite or zeolite nanoparticles include filtration membranes, molecular sieve membranes and catalyzation membranes. See, for example, the review article by Anthony Cheethan, Gerald Ferey and Thierry Loiseau in *Angewandte Chemie International Edition*, Vol. 38, pp. 3268–3292 (1999).

SUMMARY

The present invention relates to the formation of hydrophobic organosols of silicalite and zeolite nanocrystals ("SNCs") which, among other applications, can be used in spin-coating of thin films for dielectric layers in integrated circuit ("IC") fabrication. SNCs are typically grown in an alkaline, aqueous medium, and deposited onto the IC, typically by spin-on deposition. However, SNCs deposited onto the IC wafer are insufficient to form a dielectric layer and need to be bound together into a porous solid, having sufficient mechanical and thermal stability to withstand further IC fabrication steps. Typically, a binder containing silica is used for coagulating SNCs into a porous, low k dielectric on the wafer surface. That is, a porous, siliceous binding agent is typically used along with SNCs to form silicalite dielectric layers. Typical binding agents include materials that polymerize or crosslink upon heating, thereby binding the silicalite nanocrystals together into a porous solid consisting substantially of silicon dioxide. However, typical binding agents are very reactive in the presence of water, and even more so in the presence of water and base. Thus, aqueous solutions of SNCs, especially alkaline aqueous solutions, quickly gel when typical binding agents are introduced. Thus, an objective of the present invention is to provide methods for removing water from the SNCs and to redisperse them in a hydrophobic solvent from which deposition along with binding agent is more readily accomplished than from aqueous solution.

Redispersal of SNCs into nonaqueous solvent(s) is preceded by chemical modification of the Si—OH bonds typically found on the surfaces of silicalite and zeolite particles prepared in aqueous media. In some embodiments, the chemical transformation of Si—OH on the surface of the SNCs is performed so as to form a direct silicon-carbon linkage (Si—(CH$_3$)$_3$, as one example). Other embodiments react Si—OH to form an ether linkage, Si—O—R, referred to herein as "etherification." Silicalites and/or zeolites thus modified can be dispersed in hydrophobic solvents that do not catalyze agglomeration when typical binding agents are introduced.

DETAILED DESCRIPTION

Figure 1:
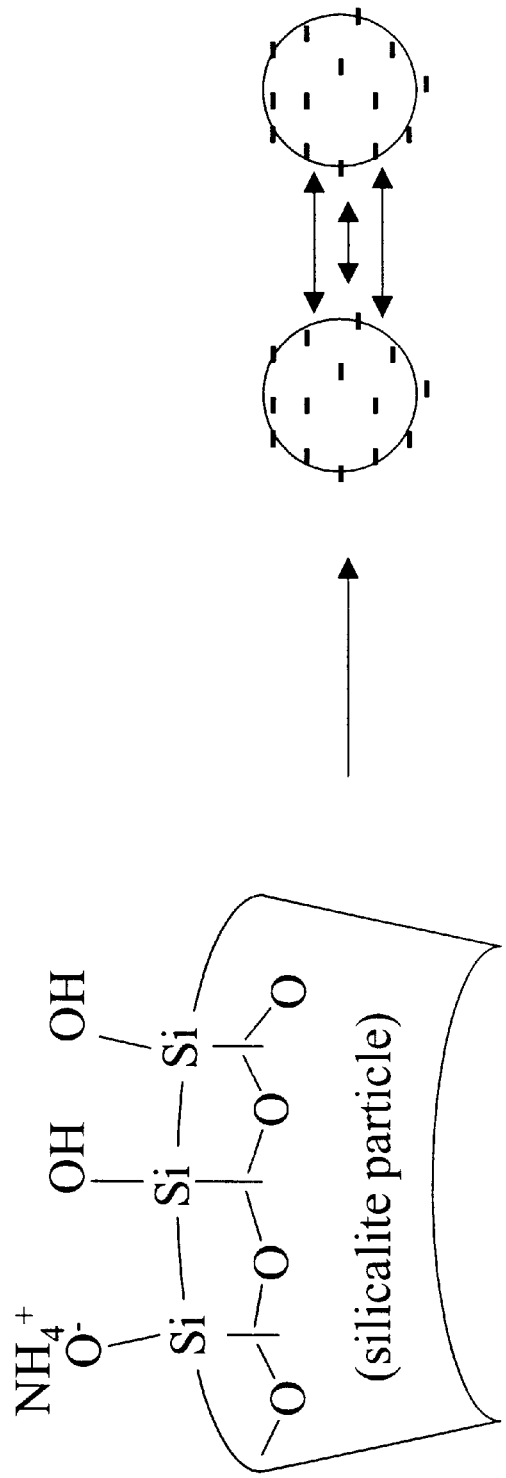
FIG. 1: Schematic depiction of particle-particle repulsion induced by a basic environment.

For economy of language, the term "silicalite" will be used herein to describe both true silicalites and also zeolites that may be processed by the methods described herein, typically high-silica zeolites. Examples include the recognized crystalline forms conventionally abbreviated as follows: ABW, ACO, AEI, AEL, AEN, AET, AFG, AFI, AFN, AFO, AFR, AFS, AFT, AFX, AFY, AHT, ANA, APC, APD, AST, ATN, ATO, ATS, ATT, ATV, AWO, AWW, BEA, BIK, BOG, BPH, BRE, CAN, CAS, CFI, CGF, CGS, CHA, -CHI, -CLO, CON, CZP, DAC, DDR, DFO, DFT, DOH, DON, EAB, DEI, EMT, EPI, ERI, ESV, EUO, FAU, FER, GIS, GME, GOO, HEU, IFR, ISV, TIE, JBW, KFI, LAU, LEV, LIO, LOS, LOV, LTA, LTL, LTN, MAZ, MEI, MEL, MEP, MER, MFI, MFS, MON, MOR, MSO, MTF, MTN, MTT, MTW, MWW, NAT, NES, NON, OFF, OSI, -PAR, PAU, PHI, RHO, -RON, RSN, RTE, RTH, RUT, SAO, SAT, SBE, SBS, SBT, SFF, SGT, SOD, STF, STI, STT, TER, THO, TON, TSC, VET, VFI, VNI, VSV, WEI, -WEN, YUG or ZON. The detailed structures and compositions for these zeolites are given in conventional references, including the *Atlas of Crystal Structure* published by the International Zeolite Association, and the website of the International Zeolite Association, www.iza-structure.org. As one particular example intended to be illustrative and not limiting, processing conditions and materials are presented for the redispersion of zeolite "MFI." The structure of MFI is given at the above-referenced website and reproduced herein as Table I. MFI is considered by way of example and not limitation as it is anticipated that similar procedures will be applicable to other zeolites as described and listed herein.

"Silicalite nanocrystal" or "SNC" as used herein are understood to include both true silicalite nanoparticles as well as other zeolite nanoparticles. Typically, zeolites containing a high fraction of silica (typically greater than about 80% of the T sites occupied by silicon atoms, or 4:1 ratio of Si to Al or other elements) will be amenable to redispersion in nonpolar solvents by the procedures described herein. It is anticipated that the present invention will find its initial application in the creation of ILDs using true silicalite nanoparticles, and this case is discussed in greatest detail. However, applications of the present invention to other zeolite nanoparticles are obvious to those having ordinary skills in the art and are included within the scope of the present invention.

The present invention relates to previous work described and claimed in U.S. application Ser. No. 09/514,966 commonly assigned herewith and incorporated herein by reference ("'966"). The '966 application relates to the use of silicalite nanocrystals as a dielectric material in connection with the fabrication of integrated circuits. "Nanocrystal" and "nanoparticle" are used interchangeably herein without distinction and are defined as discrete crystals which are sufficiently small to remain in colloidal suspension essentially indefinitely, typically crystals in the size range from about 80 Angstroms to about 5000 Angstroms in diameter (1 Angstrom=$10^{-8}$ cm). SNCs are typically grown in an alkaline, aqueous medium, and deposited onto the IC, typically by spin-on deposition. However, SNCs deposited on the IC wafer are insufficient by themselves to form a dielectric layer and need to be bound together into a monolithic porous solid, having sufficient mechanical and thermal stability to withstand further IC fabrication steps. Typically, a binder containing silica is used for coagulating SNCs into a porous, low k dielectric on the wafer surface. That is, a porous, siliceous binding agent is typically used along with SNCs to form silicalite dielectric layers. Typical binding agents include materials that polymerize or crosslink upon heating, thereby binding the silicalite nanocrystals together into a porous solid. Examples include tetraethoxysilane ("TEOS") and its partially hydrolyzed derivatives, tetramethoxysilane ("TMOS") and its partially hydrolyzed derivatives, compounds derived from the family of silsesquioxanes including methylsilsesquioxane ("MSQ"), hydridosilsesquioxane ("HSQ") and the polyoctahedralsilsesquioxanes ("POSSs"), cyclosiloxanes and their derivatives, among others. One characteristic by which binding agents differ from SNCs is that the binding agents typically comprise single molecules or, at most, an oligomer of not more than a few repeat units. This is in contrast to the SNCs which may contain hundreds or thousands of unit cells. Although there is not a precise distinction between a solution and a suspension, the binding agents may generally be described as in solution while the SNCs are large enough entities to warrant description as a colloidal suspension.

There is a need for a stable colloidal suspension of SNCs in a nonaqueous solvent that can also contain a binding agent in the same solution, forming thereby a single system that can be deposited onto a semiconductor wafer (in IC fabrication) or onto another substrate. The present invention includes methods for removing SNCs (and other zeolite nanoparticles) from aqueous solution and redispersing them in a nonaqueous solvent (or mixture of solvents). The primary purpose of performing this redispersal is to allow binding agents to be added to the nonaqueous solution of SNCs while avoiding premature binding catalyzed by the presence of water in contact with SNCs and typical binding agents. Therefore, solvents lacking the catalytic properties of water are candidate solvents for the redispersal of the SNCs pursuant to the techniques of the present invention. Typically the nonaqueous solvent will be one or more hydrophobic solvents to reduce the catalytic effect of water on the binding agents. The solvents should be sufficiently hydrophobic that they do not absorb moisture from the atmosphere. Additionally, organic dispersions tend to produce higher-quality films on most substrates due to their superior wetting and spreading properties, notably silicon wafers and other substrates common in the fabrication of integrated circuits.

The redispersal of SNCs into nonaqueous solvent(s) is preceded by chemical modification of the Si—OH bonds typically found on the surfaces of silicalite and/or zeolite particles. In some embodiments, the chemical transformation of Si—OH on the surface of the SNCs is performed so as to form a direct silicon-carbon linkage (Si—(CH$_3$)$_3$, as one example). Other embodiments react Si—OH to form an ether linkage, Si—O—R, referred to herein as "etherification."

Direct Silicon-Carbon Bonds

The starting material for forming direct Si—C bonds pursuant to some embodiments of the present invention is typically nanocrystalline silicalite or colloidal zeolite as synthesized by previously disclosed methods, including the '966 application and the work of Iler (U.S. Pat. No. 2,801,185, incorporated herein by reference).

The SNCs are typically synthesized in the form of a colloidal suspension in aqueous solution having a pH typically in excess of 14. The solution is centrifuged and redispersed in de-ionized ("DI") water as many times as necessary to reduce the pH of the aqueous SNCs to around 9. Typically, centrifugation occurs for a minimum of approximately two hours at a force of at least approximately 30,000×g, resulting in a solid silicalite pellet residing below a more-or-less clear aqueous environment. To recover a colloidal suspension from the pellet, the pellet is exposed to fresh DI water and redispersal is spontaneous. Optionally, redispersal may be accelerated by mechanical means, such as ultrasonic agitation. The solid pellet typically has an amount of alkaline aqueous medium entrained therein, requiring additional cycles of centrifugation and dispersal in DI water. At pH greater than about 9, the suspension is susceptible to gelation via the base-catalyzed reaction of surface Si—OH groups and elimination of water as:

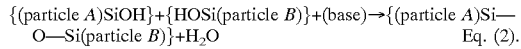
{(particle A)SiOH}+{HOSi(particle B)}+(base)→{(particle A)Si—O—Si(particle B)}+H$_2$O  Eq. (2).

Despite this potential gelation route, the suspension is stabilized by the distribution of negative charges on the outer surface of the particles, which is caused by base-driven removal of H$^+$ ions from the Si—OH bonds present on the surface of the particles. This stabilization mechanism is depicted in FIG. 1. Thus the tendency of the particles to repel each other due to the presence of negative surface charges at pH greater than about 9 typically overcomes the tendency to react and gel.

The pH of the colloidal suspension is then reduced to a value of about 3 or less, typically by the addition of an acid or by passing the suspension through an ion exchange column. If acid is added, the aqueous basic solution with a pH of about 9 is advantageously stirred rapidly and the proper amount of acid added quickly. Alternatively, the basic solution can be added slowly to a solution with a pH between about 0 and about 2, while stirring, until the solution reaches the desired pH value, e. g. between about 2 and 3. The choice of acid used in performing this pH reduction is not critical, but acids having detrimental effects on subsequent applications of the suspension are disadvantageous. In particular, acids prone to attacking the crystals, such as HF, should be avoided.

Addition of acid to the basic solution typically leads to the formation of salts in solution. For example, the addition of hydrochloric acid to a solution containing tetrapropyl ammonium hydroxide will yield tetrapropyl ammonium chloride salts. These salts tend to destabilize the suspension during organic solvent replacement if they are not removed. Therefore, acidification is followed by additional centrifugation and redispersion step(s). After centrifugation, the decantent, which contains the salts in solution, is discarded. Generally, the pellet is less amenable to spontaneous redispersion in an acidic environment and some form of mechanical agitation is required to complete the redispersion is a reasonable amount of time.

When the silica is suspended in an aqueous acid solution, there is typically insufficient surface charge on the particles to prevent them from coming into contact. However, the reaction described in Equation (2) is greatly retarded in the presence of a highly acidic solution, due to the overabundance of H$^+$ ions already in solution. Replacement of water by an organic liquid in this highly acidic pH regime typically leads to a slow but uncertain rate of agglomeration which, if unchecked by the methods described in this invention, continues indefinitely. However, surface passivation by the methods described herein effectively terminates the gelation reaction of Equation (2). Therefore, it is advantageous that the surface passivation procedures described herein follow the acid redispersion step as quickly as is reasonably achievable.

After the desired pH is achieved (typically less than about 3 and preferably between 2 and 3), an organosol is formed, generally following the methods of Iler, supra (herein referred to as the "Iler process"). The starting material for the Iler process is, thus, a colloidal suspension chemically stabilized by acid that reduces the rate of gelation reaction, Eq. (2). The final material is a colloidal suspension in an organic liquid in which the particles are passivated via silicon-carbon bonds. As an intermediate step, a non-passivated colloidal suspension in alcohol, referred to as an "alcosol" is formed. During the intermediate steps to produce the final material in organic liquid from the starting material in aqueous solution, water is present in the system. The suspension is most stable when the water volume is greater than about 25% or less than about 1%. Therefore, during the solvent replacement process (organic liquid replacing water) a degree of agglomeration will take place. An improved final dispersion in organic liquid results if the degree of agglomeration is kept small. The rate of agglomeration is dependent upon the amount of water present, the temperature at which the intermediate steps are performed and the time taken to carry out the intermediate steps. The rate of agglomeration is also dependent upon the concentration of particles in the evolving system at various stages during processing; greater dilution of particles reducing the chances for particles to interact and, therefore, reducing the rate of agglomeration. Both time and temperature of the intermediate steps may be reduced by performing the solvent replacement under reduced pressure. The ratio of organic liquid (typically alcohol) to water during solvent replacement is advantageously kept as high as reasonably achievable.

A container of organic alcohol having relatively few carbons (for example, methanol, ethanol, n-propanol) is prepared. The alcohol chosen for the system is preferably the highest-carbon linear alcohol that does not result in destabilization of the colloidal suspension. In practice, this depends upon the degree of impurities in the system as well as the time and temperature at which the process is carried out. The time and temperature at which the process is favorably performed depend in turn upon the pressure under which the solvent replacement is carried out. At atmospheric pressure, alcohols having more than three carbons (i.e. butanol, pentanol, among others) have been found to have a tendency to gel during solvent replacement. At reduced pressure, lower temperatures can be employed for the solvent replacement steps and alcohols having more than three carbons may be used. Generally, linear alcohols tend to be less susceptible to gelation than are branched alcohols.

To be definite in our description, we describe specific procedures found to be convenient for solvent replacement pursuant to the present invention. Modifications of the specific procedures described herein are apparent to those skilled in the art and included within the scope of the present invention.

Pursuant to some embodiments, two solutions are initially prepared. A first solution (Solution 1) typically comprises a relatively large volume of an alcohol, the type of alcohol chosen according the criteria described above. A second (Solution 2) consists of a volume of the aqueous colloidal silica suspension described above (that is, with pH less than about 3), no greater than approximately 25% of the volume of Solution 1. A quantity of alcohol (Solution 3) is added to Solution 2 in the volume ratio of approximately 1:3, Solution 2:Solution 3. The result of this mixing is referred to as Solution 4. Generally, Solution 3 is chosen to be the same alcohol as Solution 1, though this is not inherently necessary in the practice of the present invention. At a 1:3 volume ratio of aqueous silicalite to alcohol, (Solution 2 to Solution 3), the mixture still has sufficient water and acid present to reduce the rate of agglomeration to acceptable levels.

Solution 1 is typically placed under reduced pressure or elevated temperature or both. A small amount of Solution 4, typically about 2% of its total volume, is slowly stirred into Solution 1. The solution resulting from this addition is referred to as Solution 5. The concentration of solids in Solution 5 is not constant but increases as more Solution 4 is added. At this point in the procedure, the particles in Solution 5 are thermodynamically susceptible to agglomeration, but rapid agglomeration is prevented by the extreme dilution (about 0.5% aqueous suspension per addition of Solution 4, assuming 2% added per addition, of which typically only 10%–30% is actually particles, for a total particle concentration of about 0.05% to 0.15%) The reduced pressure and/or elevated temperature of Solution 5 typically causes it to evaporate fairly quickly. A constant ratio of alcohol to water may be maintained by treating Solution 5 in a distillation column. If the vapor pressure of the alcohols is lower then the vapor pressure of water, which is true for all alcohols having fewer carbons than butanol, an azeotropic distillation column may be employed. Alternately, additional alcohol may be supplied to Solution 5 to maintain a high alcohol-to-water ratio (the water being supplied by Solution 4).

The volume of Solution 5 is maintained substantially at its original level despite evaporation by the addition of more alcohol and Solution 4, in a ratio of at least 7:1 alcohol:Solution 4. The actual ratio is determined by the relative rates of evaporation of water and the alcohol employed. The result of this process is that eventually all of Solution 4 will have been stirred into Solution 5, while most of the water from Solution 4 will have evaporated and been replaced by alcohol. Particles added to Solution 5 by addition of Solution 4 will acquire some degree of stabilization from the etherification process before the next addition of Solution 4. Thus, at the end of the process, Solution 5 will consist of partially stabilized silicalite particles suspended in alcohol with less than about 1% water by volume. The total volume of Solution 5 will be about four times the original volume of Solution 2, so the percent solids in Solution 5 will be about one-forth the percent solids in the original acidic suspension. The volume may then be reduced by additional evaporation until the desired concentration of solids is reached. The redispersion of the SNCs in an alcohol has thus been accomplished.

The above redispersion procedures can be summarized as a sequence to distinct process steps, 1–5 as follows:

1) Prepare an aqueous solution of SNCs having a pH of approximately 2–3 as described above. This may be achieved by addition of an appropriate acid, as described above, or by passing through an ion exchange column.

2) The solution of step 1 is diluted by the addition of an alcohol. The amount of alcohol added should be such that the water remaining in solution is sufficient to stabilize the silicalite suspension. Precipitation, gelling and/or agglomeration of the SNCs is to be avoided by keeping the amount of alcohol present in the solution sufficiently small. In practice, a volume ratio of alcohol to aqueous suspension of approximately 3 to 1 is used. In this example, 375 ml alcohol is added to 125 ml acidic aqueous solution for a total volume of 500 ml.

3) A second vessel containing typically about an equivalent volume as the first vessel of pure alcohol, typically 1-propanol but also possibly comprising ethanol or methanol, is prepared (typically with a stirring bar) and heated to near its boiling point. The temperature may be reduced by placing the vessel in a reduced-pressure atmosphere, thus reducing its boiling point. There are now two vessels, one containing ~375 ml alcohol plus ~125 ml acidic silicalite suspension, and the other containing ~500 ml pure alcohol.

4) The alcohol-diluted acidic silicalite suspension is slowly and incrementally stirred into the second pure-alcohol solution. Typically, not more than about 5% of the volume of the vessel, or 25 ml in this example, is added at one time. After addition of the diluted silicalite suspension, the volume in the second vessel is allowed to reduce via evaporation of the solvent and water (which is derived from the acidic aqueous solution.) When the volume has been reduced to, for example, 400 ml from the original level of about 500 ml, about 100 ml fresh alcohol is added to the system, along with another 25 ml from the original vessel. In this manner, the entire 500 ml of the first vessel is stirred into the second vessel. Further cycles of evaporation and fresh solvent addition are employed to ensure the final water content in the second vessel ends up at below about 1%.

5) At this stage, we have prepared silicalite nanoparticles partially etherized but primarily having silanol bonds still remaining on the exterior particle surfaces. The water is largely dissipated and the SNCs have been redispersed from water into a polar alcohol solvent. However, polar solvents tend to absorb water from the ambient air. Even the small amount of water so absorbed may be sufficient to destabilize binding additives that must be added to make spin-on porous silicalite low k structures on ICs, or other monolithic films for other applications such as molecular sieve membranes or catalyst membranes. A methylating (or other alkylating) reagent is now added to the solution that substitutes the ——OH or ——OR groups from the surface of SNC particles and replaces these groups with a Si—R' surface structure. Generally, an excess of methylating agent is provided to ensure complete surface modification. Examples of these chemicals added included hexamethyldisilizane ("HMDS"), acetaldehyde and trimethylchlorosilane, among others. If the methylating agent is not miscible with the alcohol in the alcosol, constant stirring will be required to expose the silicalite particles to the methylating reagent. The direct Si——C bonds thus obtained on the outer surface of the particles will have significantly greater thermal stability than the silanol or etherized bonds they replace, which may be advantageous in many applications. In the case of HMDS or trimethylchlorosilane, the resulting structure on the surface of the silicalite nanoparticles is (silicate)——Si——$(CH_3)_3$. In the case of acetaldehyde, the resulting structure on the surface will be Si——$CH_3$. Gaseous reaction byproducts such as ammonia or chlorine typically are generated by the methylation reaction as shown in Eq. 3. These byproducts are generally volatile for the reagents listed above and easily removed from the system by evaporation.

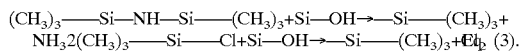
$(CH_3)_3$——Si—NH—Si——$(CH_3)_3$+Si—OH→—Si——$(CH_3)_3$+ NH$_3$2$(CH_3)_3$——Si——Cl+Si—OH→—Si——$(CH_3)_3$+Cl$_2$ (3).

Other reagents with higher-carbon ligands may also be employed if a greater carbon content is desired; the only requirement is that the reagent be miscible with the alcosol in sufficient quantity to allow complete passivation of the particles. As depicted in FIG. 2 of the Iler reference supra, etherification of surface silanol bonds is sterically hindered if R' is too large. The same principle is expected to apply in direct silicon-carbon linkages. That is, steric hindrance to the creation of direct Si—C bonds will impede the reaction on the particle surface if too large group(s) are attached to the C attacking the Si.

The methylating agent will typically react with the silanol groups on the external surface of the SNCs and partially or completely convert the external silicalite surface to, Si——$CH_3$ (hereinafter referred to as methylated silicalite), or to Si——$(CH_3)_3$ (hereinafter referred to as trimethylated silicalite). This methylation or trimethylation renders the silicalite particles nonpolar, or only very weakly polar, and also chemically resistant to particle-to-particle agglomeration reactions or particle-to-binder reactions in the presence of typical binders. The passivation of the SNC surface by the formation of direct Si—C bonds as described herein allows a stable suspension of the particles in a nonpolar solvent, where the small size of the particles and their lack of reactivity allows them to remain in suspension as a result of Brownian motion.

Alcohols tend to be at least weakly hygroscopic and tend to absorb of water from the atmosphere. This could lead to gelation and decreased shelf life of the alcosol in the presence of typical binders, which may later be added to the alcosol. Thus Solution 5 may need to be redispersed in a hydrophobic nonpolar solvent. The redispersion of the SNCs from this polar solvent into a hydrophobic solvent proceeds as described elsewhere herein.

As the methylation reaction proceeds to completion the reaction mixture includes methylated or trimethylated silicalite particles dispersed in the nonpolar solvent. If the methylating reagent is not fully miscible with the alcosol, it will tend to separate from the alcosol when stirring is stopped. Excess methylating agent can be removed by decanting or distillation. The particles may now be redispersed in a nonpolar organic solvent or combination of solvents. This redispersal is typically performed by slowly stirring the alcosol into an excess of nonpolar solvent at elevated temperature and/or reduced pressure. If the vapor pressure of the alcohol is lower than the vapor pressure of the nonpolar solvent, the alcohol may simply be removed by heating as it is slowly added to the nonpolar solvent. If the alcohol has a lower vapor pressure than the nonpolar solvent, either a different nonpolar solvent may be chosen or an azeotropic distillation may be employed. Thus, methylated or trimethylated silicalite or zeolite particles suspended in a hydrophobic solvent are the result.

Methylisobutylketone is a typical nonpolar solvent found to be useful for redispersing methylated SNCs. Other solvents include benzene, trimethylbenzene and cyclohexane among others.

Methylated silicalites are chemically inert and hydrophobic until the temperature is raised sufficiently high to cause reaction. Typically, methylated or trimethylated silicalites remain stable until temperatures in the range of approximately 350° C. to 450° C. are applied. If a binder is used for the creation of a spin-on dielectric that requires higher temperatures to react, it is important that the silicalite particles required to be bound together into the monolithic film remain stable up to those temperatures. Thus, the use of methylated or trimethylated silicalites is called for if high temperature reacting binders, such as silsesquioxanes, are employed.

Etherification

Etherification relates to coating the surfaces of the silicalite nanoparticles by means of an ether linkage Si——O——R. This surface structure of silicalite decomposes at temperatures in the range from approximately 170° C. to approximately 230° C. Thus, etherification is contraindicated if temperatures above this range are anticipated later in the coating process and methylation or trimethylation is preferred. On the other hand, many typical binding agents evaporate rapidly at temperatures higher than about 230° C. Thus, if reaction with any of these binding agents is desired it is also desirable that the silicalite particles lose their passivation and become once again reactive at these lower temperatures, prior to the evaporation of the binding agent. For example, prehydrolyzed TEOS is an etherized silicon atom, decomposing and binding at substantially the same temperature range as decomposition of etherized silicalite, that is from approximately 170° C. to approximately 230° C. Therefore, etherized silicalite particles are preferred with TEOS or TMOS binding agents as etherized silicalite particles lose their etherized passivation in approximately the same temperature range at which binding occurs. Similar considerations apply in evaluating the suitability of other binding agents for use with etherized or methylated/trimethylated SNCs.

The process of etherification typically begins with the same initial steps (steps 1–4) as given above in connection with silicalite methylation, resulting in an acid-stabilized alcosol. At this stage in the etherification process, approximately 10%–20% of the etherizable silanol bonds on the silicalite surfaces have been etherized. Not all silanol bonds are etherizable since silanol bonds are less bulky than ether bonds. The number of etherizable silanol bonds is lower than the number of actual silanol bonds due to steric constraints, as illustrated in FIG. 2 of Iler supra. The number of silanol groups actually able to undergo etherification depends on the size of the R group. When substantially all etherizable groups have undergone etherification, the resulting coating of the surface, while not fully reacted, provides an "umbrella" of R groups effectively shielding the unreacted Si—OH from further reaction. Therefore, while 100% etherification of the surface of silicalite is not feasible, it is not necessary. The reactants are typically kept under high heat and for sufficient time to maximize the etherification, thereby effectively rendering the silicalite surface chemically inert. It is important that the remaining water in the system be kept below about 1% during this high temperature treatment. The surface alkyl groups of the etherized silicalite provide sufficient blockage and inaccessibility to the remaining silanol groups.

The reaction temperature and time required to etherize the silicalite surface depends on the choice of alcohol. For most alcohols, the reaction is favorably carried out under pressure to maintain the alcohol in a liquid state during reaction. While alcohols are generally favorable for this reaction, some other reagents such as acetone may be used as well. For economy of language, the term "alcohol"is used throughout, although other polar solvents capable of carrying out the etherification are understood to be included as well. To achieve reasonable reaction times, it is preferred to heat the reaction mixture to a temperature above the boiling temperature of the alcohol. For n-propanol (b.p.=98° C.), reasonable reaction times (that is, about 8 hours or less) would require heating to temperatures in the range of 130° C.–300° C., which requires a pressure vessel in order to keep the reactants in a liquid state. At about 130° C., the particles typically become fully etherized in up to about 8 hours. At 300° C., the particles typically become fully etherized in about 20 minutes. Reactions are typically performed between these two temperatures with the choice guided by convenience and equipment availability.

MFI Zeolite

An additional example relates to the redispersion of MFI zeolite. A colloidal suspension of silicalite having the crystal form of MFI is formed by combining into a plastic vessel the appropriate volumes of reagents to achieve the following molar ratios:

a) 9:25:480 of tetrapropyl ammonium hydroxide:TEOS:water b) 9:25:200 of tetrapropyl ammonium hydroxide:TEOS:water or any molar ratio between (a) and (b) above.

The mixture is shaken and/or stirred for not less than one hour and immersed while sealed in a constant temperature bath (typically an oil bath) for not less than 16 days (384 hours) at a fixed temperature of about 45° C. This is followed by immersion in a constant temperature bath of approximately 80° C. for a time from approximately 8 hours to approximately 48 hours. A colloidal suspension of silicalite-1 crystals is the result having particles with average diameters ranging from approximately 100 A (Angstrom) to approximately 2000 A and a pH of about 14. The pH is reduced to about 9–10 by repeated centrifugation and redispersion in de-ionized ("DI") water for as many times as necessary. The pH of the suspension is further reduced to the range of approximately 2–3, typically by the addition of about 20% by volume of 1-Molar hydrochloric acid.

The resulting acidic colloidal suspension is separated into a solid phase and a liquid phase by centrifugation. The solid phase consists essentially of silicalite crystals and the liquid phase consists of water, excess hydrochloric acid and dissolved salts of tetrapropyl ammonium chloride. The liquid phase is discarded and the solid phase is redispersed in DI water or in DI water containing sufficient hydrochloric acid to achieve a final pH of about 2–3. The redispersion will typically require mechanical agitation or ultrasonic vibration.

The acidic colloidal suspension is now made into an alcosol by diluting the 100% aqueous suspension to about 25% to 30% aqueous suspension, the remainder consisting of methanol, ethanol or 1-propanol. This diluted alcosol is slowly poured into a rapidly stirred second vessel containing pure methanol, ethanol or 1-propanol. The liquid is held under heat and/or reduced pressure to enhance the evaporation rate. Additional quantities of the diluted aqueous sol is added in small increments. The volume of the second container is allowed to be reduced by evaporation. Then at least three parts (up to ten parts) of pure methanol, ethanol or 1-propanol to each part of the dilute aqueous sol is added to this second vessel and, in this manner, the water concentration in the second vessel is kept below about 1%. Ultimately an alcosol is formed in the second vessel in which a small fraction of the silanol bonds on the surfaces of the silicalite particles are converted by chemical reaction into Si—O—R groups, where typically R=CH$_3$ (when methanol is used), R=CH$_2$—CH$_3$ (when ethanol is used) and R=CH$_2$—CH$_2$—CH$_3$ (when 1-propanol is used). Additional application of high temperature, in the range from approximately 130° C. to approximately 300° C., will fully convert the outer surfaces to etherized bonds, if so desired.

If direct Si—C bonds on the outer surfaces of the particles are desired, then the step heating to the range 130° C. to 300° C. is omitted. In place of this heating step, an excess of either hexamethyldisilazane, trimethylchlorosilane, dimethyldichlorosilane or acetaldehyde is slowly added to the alcosol in the second vessel and stirred rapidly under mild heating to achieve the replacement of essentially all of the available silanol bonds with silicon-carbon (hydrocarbon) bonds.

The alcosol is then poured slowly from the second vessel into a third vessel containing a substantially hydrophobic solvent such as benzene, cyclohexane, methylisobutylketone, trimethylbenzene or propylene glycol monomethyl ether acetate and in which the alcosol is at least partially miscible. The amount of alcosol in the system is kept below the upper miscibility limit and the methanol, ethanol or 1-propanol is distilled out. The result is a final product consisting of hydrocarbon-coated silicalite particles suspended in a hydrophobic organic solvent.

The material so produced can be combined with a silicon-containing small molecule binder, typically TEOS, TMOS, partially hydrolyzed TEOS or TMOS, or any of the silsesquioxanes, polyoctahedralsilsesquioxanes, tricyclosiloxanes or tetrasiloxanes in sufficient quantity to serve as a binder when the materials are spin-cast and thermally treated.

Having described the invention in detail, those skilled in the art will appreciate that, given the present disclosure, modifications may be made to the invention without departing from the spirit of the inventive concept described herein. Therefore, it is not intended that the scope of the invention be limited to the specific and preferred embodiments illustrated and described.

We claim:

1. A method of preparing silicalite or zeolite nanoparticles dispersed in a hydrophobic solvent comprising:

a) preparing a suspension of nanoparticles in alkaline aqueous solution having a pH of about 14; and, b) reducing the pH of said alkaline aqueous solution to a pH of about 9 by performing at least one operation of removing excess base and replacing with water; and, c) reducing the pH of said alkaline aqueous solution to less than about 3, producing thereby an acidic aqueous solution; and, e) diluting said acidic aqueous solution with alcohol such that said nanoparticles remain in suspension, producing thereby an alcosol; and, f) reacting said nanoparticles in said alcosol with an alkylating reagent such that substantially all accessible silicon atoms on the surfaces of said nanoparticles are alkylated; and h) dispersing said alkylated nanoparticles in a hydrophobic solvent.

2. A method as in claim 1 wherein said alkylating agent is selected from the group consisting of hexamethyldisilizane, acetaldehyde and triemthylchlorosilane.

3. A method of preparing silicalite or zeolite nanoparticles dispersed in a nonpolar solvent comprising:

a) preparing a suspension of nanoparticles in alkaline aqueous solution having a pH of about 14; and, b) reducing the pH of said alkaline aqueous solution to a pH of about 9 by performing at least one operation of removing excess base and replacing with water; and, c) reducing the pH of said alkaline aqueous solution to less than about 3, producing thereby an acidic aqueous solution; and, e) diluting said acidic aqueous solution with alcohol such that said nanoparticles remain in suspension, producing thereby an alcosol; and, f) reacting said nanoparticles in said alcosol with an etherification reagent such that substantially all accessible silicon atoms on the surfaces of said nanoparticles are etherized; and h) dispersing said etherized nanoparticles in a nonpolar solvent.

4. A method as in claim 3 wherein said etherification reagent is an alcohol.

5. A method as in claim 4 wherein said alcohol is selected from the group consisting of methanol, ethanol and 1-propanol and mixtures thereof.

6. A method as in claim 1 or claim 3 wherein said nanoparticles are selected from the group consisting of ABW, ACO, AEI, AEL, AEN, AET, AFG, AFI, AFN, AFO, AFR, AFS, AFT, AFX, AFY, AHT, ANA, APC, APD, AST, ATN, ATO, ATS, ATT, ATV, AWO, AWW, BEA, BIK, BOG, BPH, BRE, CAN, CAS, CFI, CGF, CGS, CHA, -CHI, CLO, CON, CZP, DAC, DDR, DFO, DFT, DOH, DON, EAB, DEI, EMT, EPI, ERI, ESV, EUO, FAU, FER, GIS, GME, GOO, HEU, IFR, ISV, TIE, JBW, KFI, LAU, LEV, LIO, LOS, LOV, LTA, LTL, LTN, MAZ, MEI, MEL, MEP, MER, MFI, MFS, MON, MOR, MSO, MTF, MTN, MTT, MTW, MWW, NAT, NES, NON, OFF, OSI, -PAR, PAU, PHI, RHO, -RON, RSN, RTE, RTH, RUT, SAO, SAT, SBE, SBS, SBT, SFF, SGT, SOD, STF, STI, STT, TER, THO, TON, TSC, VET, VFI, VNI, VSV, WEI, -WEN, YUG, ZON and mixtures thereof.

7. A method as in claim 6 wherein said nanoparticles comprise MFI.

8. A method as in claim 1 or claim 3 wherein said nonpolar solvent is selected from the group consisting of benzene, trimethylbenzene, cyclohexane, methylisobutylketone and mixtures thereof.

9. A method as in claim 1 or claim 3 wherein step (b) is performed by at least one sequence of;

i) centrifuging said alkaline aqueous solution such that a solid and liquid phase are formed; and, ii) decanting said liquid phase and redispersing said solid phase in de-ionized water.

10. A method as in claim 1 or claim 3 wherein step (c) is performed by adding acid to said alkaling aqueous solution or passing said alkaline aqueous solution through an ion exchange column.

11. A dispersion of silicalite or zeolite nanoparticles in a nonpolar solvent produced by the method of claim 1 or claim 3.

12. A dispersion of claim 11 further comprising at least one siliceous binding agent in said dispersion.

13. A dispersion of claim 12 wherein said at least one siliceous binding agent is selected from the group consisting of tetraethoxysilane, partially hydrolyzed tetraethoxysilane, tetramethoxysilane, partially hydrolyzed tetramethoxysilane, methylsilsesquioxane, hydridosilsesquioxane, polyoctahedralsilsesquioxanes, cyclosiloxanes, silsesquioxanes, and mixtures thereof.

\* \* \* \* \*